United States Patent
Meyers et al.

(10) Patent No.: US 12,284,981 B2
(45) Date of Patent: Apr. 29, 2025

(54) REVERSIBLE MULTILAYER COVER FOR ABSORBING AND TRAPPING LIQUIDS AND/OR DEBRIS

(71) Applicant: Magic Fabric LLC, Leesburg, VA (US)

(72) Inventors: Daniel Steven Meyers, Leesburg, VA (US); Robin Joy Meyers, Leesburg, VA (US)

(73) Assignee: Magic Fabric LLC, Leesburg, VA (US)

( * ) Notice: Subject to any disclaimer, the term of this patent is extended or adjusted under 35 U.S.C. 154(b) by 371 days.

(21) Appl. No.: 17/711,133

(22) Filed: Apr. 1, 2022

(65) Prior Publication Data
US 2023/0309505 A1    Oct. 5, 2023

(51) Int. Cl.
*A01K 1/035*    (2006.01)
*A47C 31/10*    (2006.01)
(Continued)

(52) U.S. Cl.
CPC ............ *A01K 1/035* (2013.01); *A47C 31/113* (2013.01); *B32B 7/09* (2019.01); *B32B 27/08* (2013.01);
(Continued)

(58) Field of Classification Search
None
See application file for complete search history.

(56) References Cited

U.S. PATENT DOCUMENTS 3,754,991 A * 8/1973 Amos .................. C09K 3/32
                                                          134/4
5,685,257 A * 11/1997 Feibus ................ A01K 1/0353
                                                          5/652
(Continued)

FOREIGN PATENT DOCUMENTS

CA         2583055          9/2008
DE         3635339 A  *    4/1988
WO    WO 02/054859 A  *    7/2002

OTHER PUBLICATIONS

"C6 Water Repellent" Textile Value Chain. (https://textilevaluechain.in/news-insights/dyes-chemicals-news/c6-water-repellent-mr-edward-menezes-director-rossari-biotech-ltd) (published May 7, 2020) (Year: 2020).*

(Continued)

*Primary Examiner* — Vivian Chen
(74) *Attorney, Agent, or Firm* — Nixon & Vanderhye P.C.

(57) ABSTRACT

A multilayer cover designed to protect a surface from pets includes a first layer constructed from a polyester material and a second layer coupled to the first layer. The second layer is fixed relative to the first layer. The first layer includes a first top surface having a natural charge and a hydrophilic finish. The natural charge configured to attract solid debris, and the hydrophilic finish configured to activate when contacted by a liquid in order to release the solid debris. The first layer also includes a first bottom surface positioned opposite to the first top surface. The second layer includes a second top surface disposed facing the first (Continued)

bottom surface. The second top surface includes a hydrophobic laminate. A second bottom surface is disposed opposite of the second top surface. The hydrophobic laminate is configured to block liquid from reaching the second bottom surface.

19 Claims, 9 Drawing Sheets

(51) Int. Cl.
*A47C 31/11* (2006.01)
*B32B 3/08* (2006.01)
*B32B 5/06* (2006.01)
*B32B 5/26* (2006.01)
*B32B 7/02* (2019.01)
*B32B 7/09* (2019.01)
*B32B 27/08* (2006.01)
*B32B 27/36* (2006.01)

(52) U.S. Cl.
CPC ............ *B32B 27/36* (2013.01); *A47C 31/105* (2013.01); *B32B 3/08* (2013.01); *B32B 5/073* (2021.05); *B32B 5/26* (2013.01); *B32B 7/02* (2013.01); *B32B 2250/02* (2013.01); *B32B 2250/03* (2013.01); *B32B 2250/244* (2013.01); *B32B 2255/02* (2013.01); *B32B 2255/10* (2013.01); *B32B 2262/0276* (2013.01); *B32B 2262/14* (2013.01); *B32B 2307/21* (2013.01); *B32B 2307/7145* (2013.01); *B32B 2307/724* (2013.01); *B32B 2307/7265* (2013.01); *B32B 2307/728* (2013.01); *B32B 2307/73* (2013.01); *B32B 2571/00* (2013.01)

(56) References Cited

U.S. PATENT DOCUMENTS

| | | | | |
|---|---|---|---|---|
| 5,806,925 | A * | 9/1998 | Hanley | B60N 2/60 297/229 |
| 6,458,442 | B1 | 10/2002 | Mckay | |
| 7,159,257 | B1 * | 1/2007 | Struthers | A01K 1/0353 119/28.5 |
| 7,185,604 | B2 | 3/2007 | Holte | |
| 7,793,615 | B2 | 9/2010 | Rector et al. | |
| 2003/0116744 | A1 * | 6/2003 | Kimbrell | D06M 15/507 252/8.62 |
| 2006/0112491 | A1 * | 6/2006 | Buehner | A01K 1/0157 5/691 |
| 2007/0044722 | A1 * | 3/2007 | West | A01K 1/0353 119/28.5 |
| 2007/0107662 | A1 | 5/2007 | Queen et al. | |
| 2008/0251032 | A1 * | 10/2008 | Rector | A47C 31/113 119/650 |
| 2010/0043713 | A1 * | 2/2010 | West | A01K 1/0353 119/28.5 |
| 2014/0261193 | A1 | 9/2014 | Smith | |
| 2020/0315273 | A1 * | 10/2020 | Thompson | A41D 31/125 |
| 2022/0408687 | A1 * | 12/2022 | Heath | A01K 1/0353 |

OTHER PUBLICATIONS

"Carbon Zero" Cambridge English Dictionary (https://dictionary.cambridge.org/us/dictionary/english/carbon-zero) (webpage retrieved May 18, 2024). (Year: 2024).*

The Global PFAS Problem: Fluorine-free Alternatives as Solutions. (pp. 1-3, 47-52) (2019). (Year: 2019).*

Symphony Mills—The Secrets of Our Water-Repellent Finish. (https://symphonymills.com/na-en/inspiration/secrets-our-water-repellent-finish/) (2020-2022). (Year: 2022).*

* cited by examiner

REVERSIBLE MULTILAYER COVER FOR ABSORBING AND TRAPPING LIQUIDS AND/OR DEBRIS

1 CROSS-REFERENCE TO RELATED APPLICATIONS

Not applicable.

2 BACKGROUND OF THE TECHNOLOGY

2.1 Field of the Technology

The present technology relates to a cover used to protect a surface from various debris and secretions.

3 BRIEF SUMMARY OF THE TECHNOLOGY

The present technology is directed towards providing a cover for shielding a surface from various debris and/or secretions.

One form of the present technology comprises a washable and reusable cover.

In one form, the cover may be used on a variety of surfaces including, but not limited to, a bed, a couch, a chair, a floor, on an automobile seat, and/or in a bed or trunk of an automobile.

Another form of the present technology is a cover having a first property configured to attract and trap debris and a second property configured to release the trapped debris.

In one form, the first property is a natural charge of a textile (e.g., polyester) material and the second property is a coating applied to the textile having a hydrophilic property.

In one form, the coating may enhance the natural charge.

In one form, the hydrophilic coating allows water to interact with the cover and lift the debris off of the cover, thereby allowing the cover to be cleaned and reused.

One form of the present technology comprises a cover having a first layer and a second layer.

Another aspect of one form of the present technology is the cover having a first layer configured to attract debris and a second layer comprising a waterproof material.

Another aspect of one form of the present technology is the cover being constructed from a textile material and having an inner surface constructed from a waterproof material.

Another aspect of one form of the present technology is a textile cover having a surface finish with hydrophilic properties for absorbing liquids, and a cleaning property for interacting with the absorbed liquid.

Another aspect of one form of the present technology is a textile cover comprising a first layer having a first surface configured to attract debris and a second surface opposite the first surface; wherein the first surface is coated with a material configured to be antimicrobial, stain resistant, and/or odor resistant.

Another aspect of one form of the present technology is a textile cover comprising a second layer having a first surface with a waterproof laminate and a second surface opposite to the first surface; the waterproof laminate configured to prevent liquid flow through the second layer from the first surface to the second surface.

In one form, the second surface includes a coating. The coating may be an anti-static coating. The coating may limit static engagement between the textile cover and a surface.

Another aspect of one form of the present technology is a multilayer cover configured to protect a surface, the multilayer cover comprising: a first layer constructed from a hydrophilic material configured to wick moisture, the first layer comprising: a first top surface configured to attract solid debris, and a first bottom surface opposite to the first top surface; and a second layer coupled to the first layer, the second layer comprising: a second top surface including a laminate, the second top surface being in contact with the first bottom surface, the second top surface being hydrophobic and configured to repel moisture that passes through the first layer, and a second bottom surface opposite to the second top surface, wherein the second top surface is configured to exhibit waterproof and hydrophobic properties in order to limit liquid from reaching the second bottom surface.

Another aspect of one form of the present technology is a cover configured to protect a surface from pets, the cover comprising: a first layer constructed from a hydrophilic material configured to wick moisture, the first layer comprising: a first top surface configured to attract and trap solid debris, the top layer configured to release the solid debris when the cover is washed, and a first bottom surface opposite to the first top surface; and a second layer coupled to the first layer, the second layer comprising: a second top surface including a laminate, the second top surface being in contact with the first bottom surface, the second top surface configured to repel moisture that passes through the first layer, and a second bottom surface opposite to the second top surface, wherein the second top surface is configured to exhibit waterproof and hydrophobic properties in order to limit liquid from reaching the second bottom surface.

In some forms of the previous aspects: a) the first layer and/or the second layer is constructed from a textile; b) the first layer and/or the second layer is constructed from a polyester blend; and/or c) the first layer and/or the second layer is constructed from 100% polyester.

In some forms of the previous aspects: a) the first top surface includes a static charge that is configured to attract debris; b) the first top surface includes a antimicrobial finish, a stain resistance finish, and/or an odor resistant finish; and/or c) the finish includes a soil release property configured to allow secretions to be washed out of the first layer.

Another aspect of one form of the present technology is a multilayer cover configured to protect a surface from pets, the multilayer cover comprising: a first layer constructed from a polyester material, the first layer comprising: a first top surface having a natural charge configured to attract solid debris, and a first bottom surface opposite to the first top surface; a second layer coupled to the first layer, the second layer being fixed relative to the first layer, the second layer comprising: a second top surface disposed facing the first bottom surface, the second top surface including a hydrophobic laminate, and a second bottom surface opposite of the second top surface, wherein the hydrophobic laminate is configured to block liquid from reaching the second bottom surface.

Another aspect of one form of the present technology is a multilayer cover configured to protect a surface from pets, the multilayer cover comprising: a first layer constructed from a polyester material, the first layer comprising: a first top surface having a natural charge and a hydrophilic finish, the natural charge is configured to attract solid debris, and the hydrophilic finish is configured to activate when contacted by a liquid in order to release the solid debris, the first top surface further including a first bottom surface opposite to the first top surface; a second layer coupled to the first layer, the second layer being fixed relative to the first layer, the second layer comprising: a second top surface disposed facing the first bottom surface, the second top surface including a hydrophobic laminate, and a second bottom surface opposite of the second top surface, wherein the hydrophobic laminate is configured to block liquid from reaching the second bottom surface.

In some forms, a) wherein the polyester material is 100% polyester; b) wherein the polyester material is a polyester blend; and/or c) the first layer and the second layer are sewn together.

In some forms, a) the hydrophilic finish has an antimicrobial property, a stain resistant property, and/or an odor resistant property; b) the first top surface includes the hydrophilic finish which is a Carbon zero (C0); c) the hydrophobic laminate is at least partially permeable to air and is configured to allow airflow to pass through the first layer and the second layer; and/or d) the second bottom surface includes an anti-static coating.

In some forms, a) the cover includes a retention feature that is configured to maintain the position of the first layer and the second layer relative to the surface; b) the retention feature is an elastic portion formed in at least on corner of the first layer and the second layer, the elastic portion having a first position and a second position expanded from the first position; c) the retention feature is at least one gripper formed on the second bottom surface; and/or d) the gripper has a greater coefficient of friction than the second bottom surface.

In some forms, a) the cover includes batting to weigh the first layer and the second layer; b) the batting extends around at least a portion of the perimeter; c) the batting extends around the entire perimeter; d) the batting is constructed from cotton filler, foam, or another similar material; e) the batting is connected to the first layer; f) the batting is connected to the second layer; g) the batting is connected between the first and second layers; and/or h) the batting is connected to the first layer and/or second layer via sewing.

In some forms, a) a thickness of the hydrophobic laminate is less than a thickness of the first layer; b) the second layer is constructed from a polyester material; c) the hydrophilic finish is configured to deactivate upon drying and reactivated upon contact with the liquid; d) the hydrophilic finish further includes a soil release property configured to release accumulated odors and/or stains upon contact with the liquid; and/or e) the first top surface includes a hydrophilic finish configured to absorb and disperse fluid throughout the first layer.

In some forms, a) the second bottom surface includes an anti-static coating and is configured to limit static attraction with the surface; b) a batting extending around at least a portion of the perimeter of the cover, and wherein the batting configured to weigh down the first layer and the second layer to the surface; and/or c) the batting is positioned between the first layer and the second layer, and wherein the batting is retained in place via sewing.

In some forms, a) the hydrophilic finish is a Carbon zero (C0); has an antimicrobial property, a stain resistant property, and an odor resistant property, and is configured to release accumulated odors and/or stains upon contact with the liquid; and is configured to absorb and disperse fluid throughout the first layer, and wherein the hydrophilic finish is configured to deactivate upon drying and reactivated upon subsequent contact with the liquid; and/or b) the second layer is constructed from a polyester material; hydrophobic laminate is at least partially permeable to air and is configured to allow airflow to pass through the first layer and the second layer, and a thickness of the hydrophobic laminate is less than a thickness of the first layer; and a batting extends around at least a portion of the perimeter of the cover, the batting configured to weigh down the first layer and the second layer to the surface, the batting is positioned between the first layer and the second layer, and wherein the batting is retained in place via sewing.

An aspect of one form of the present technology is a method of manufacturing apparatus.

An aspect of one form of the present technology is a method of manufacturing a cover comprising providing a first textile sheet and a second textile sheet; applying a laminate to the second textile sheet; and connecting the first textile sheet to the second textile sheet so that the laminate is not exposed.

In some forms, a) connecting includes sewing the first textile sheet to the second textile sheet.

An aspect of one form of the present technology is a method of manufacturing multilayer cover configured to protect a surface from pets, the method comprising: applying a coating to a first sheet of textile material having a natural charge; applying a laminate to a second sheet of textile material, wherein the laminate is hydrophobic and is configured to block liquid from passing through the second sheet; and connecting the first sheet to the second sheet so that the laminate contacts the first sheet.

In some forms, the method further includes, a) curing the laminate for a predetermined time period prior to connecting; b) applying a coating to the second sheet opposite to the laminate; c) wherein the coating is an anti-static coating; and/or d) applying a gripper surface to the second sheet opposite to the laminate.

In some forms, a) the textile material is a polyester; and/or b) the coating is hydrophilic.

Of course, portions of the aspects may form sub-aspects of the present technology. Also, various ones of the sub-aspects and/or aspects may be combined in various manners and also constitute additional aspects or sub-aspects of the present technology.

Other features of the technology will be apparent from consideration of the information contained in the following detailed description, abstract, drawings and claims.

4 BRIEF DESCRIPTION OF THE DRAWINGS

The present technology is illustrated by way of example, and not by way of limitation, in the figures of the accompanying drawings, in which like reference numerals refer to similar elements including:

5 DETAILED DESCRIPTION OF EXAMPLES OF THE TECHNOLOGY

Before the present technology is described in further detail, it is to be understood that the technology is not limited to the particular examples described herein, which may vary. It is also to be understood that the terminology used in this disclosure is for the purpose of describing only the particular examples discussed herein, and is not intended to be limiting.

The following description is provided in relation to various examples which may share one or more common characteristics and/or features. It is to be understood that one or more features of any one example may be combinable with one or more features of another example or other examples. In addition, any single feature or combination of features in any of the examples may constitute a further example.

5.1 Cover

The present technology relates to a cover that can be used with various items of furniture (e.g., a bed, a couch, a chair, automobile interior, etc.) in order to prevent or limit debris or secretions from reaching the surface of the furniture.

In some forms, the cover is usable with pets and may cover furniture or other surfaces frequently used by pets. The cover may block or limit pet debris or secretions from reaching the surface of the furniture.

In some forms, humans may also use the cover with their pets. The cover may therefore be constructed at least partially from a soft and/or comfortable material (e.g., a textile) that humans and/or pets can remain on for long periods of time.

In some forms, the cover may be formed from a textile material. The cover may have one or more layers connected together.

For example, one form of the present technology is the cover 100 that includes a first layer 104 and a second layer 106. Both the first and second layers 104, 106 may be constructed from a textile. The first layer 104 and the second layer 106 may each include one or more properties that may assist in protecting a surface (e.g., from pet secretions).

5.1.1 First Layer

Figure 2:
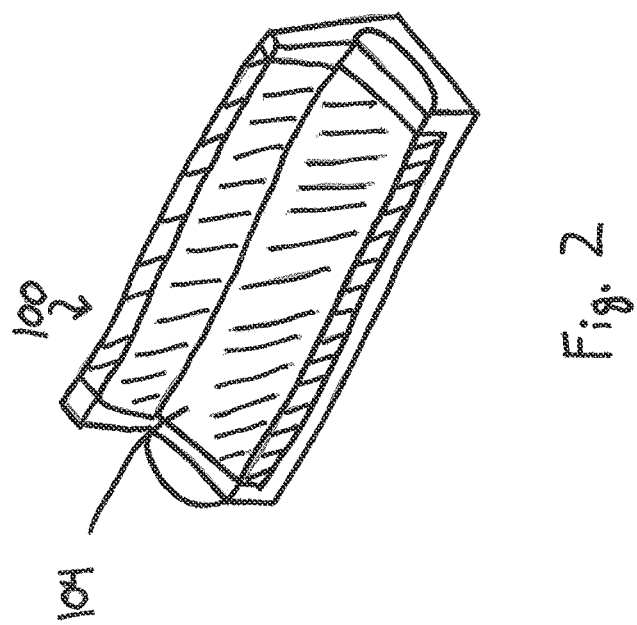
FIG. 2 is a perspective view of a cover in use on a couch in accordance with another form of the present technology.
Figure 1:
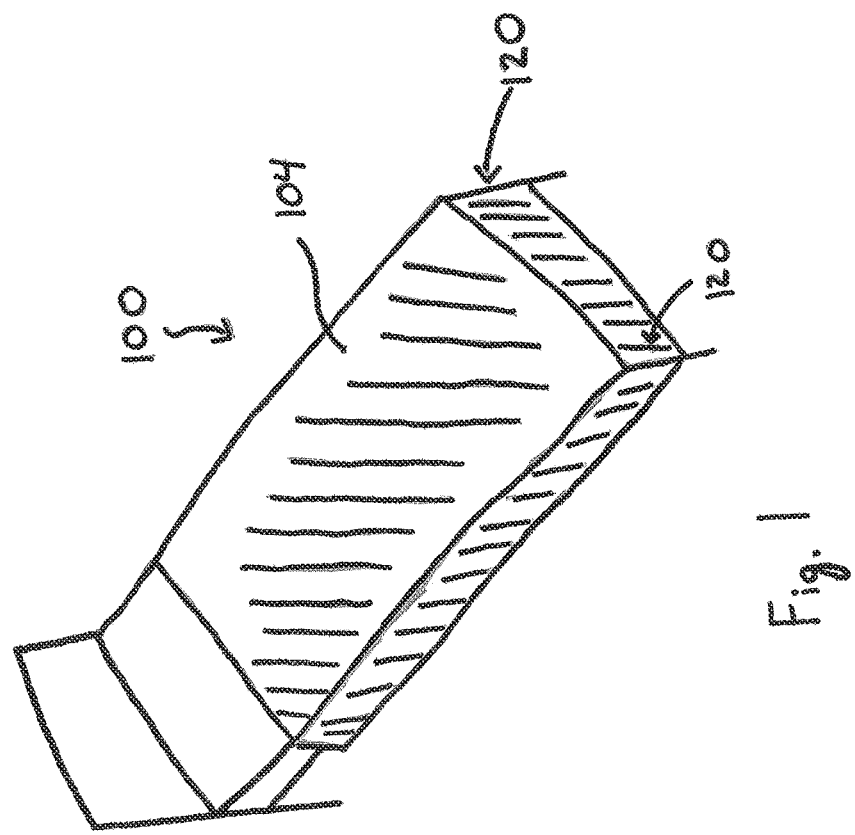
FIG. 1 is a perspective view of a cover in use on a bed in accordance with one form of the present technology.
Figure 3:
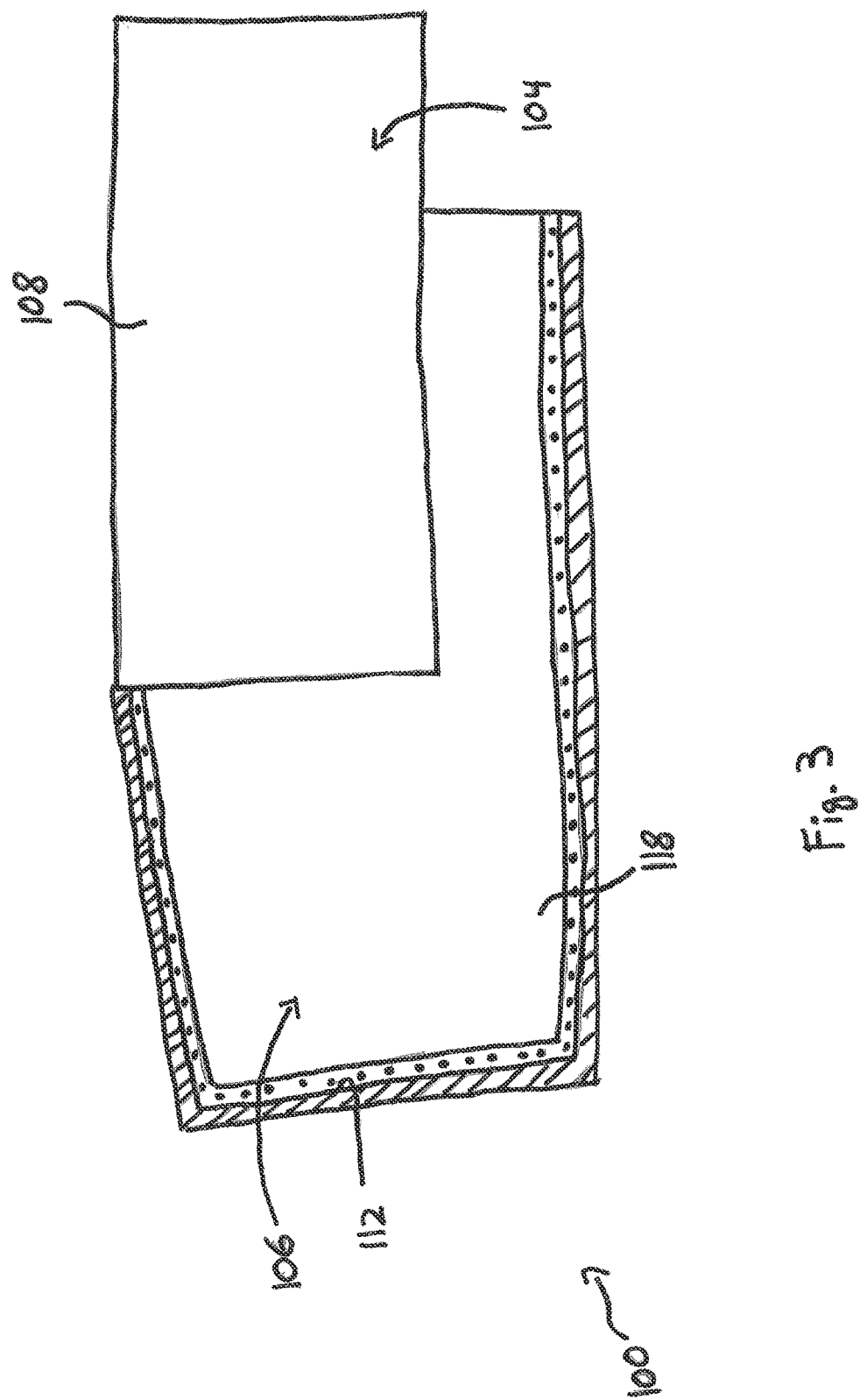
FIG. 3 is a perspective view the cover of FIG. 1 removed from the bed.

As shown in FIGS. 1 to 3, the cover 100 may include a first layer 104 with a first or outer surface 108. The outer surface 108 of the first layer 104 may be considered a top surface because it is exposed (e.g., visible) during use. However, as described below, the cover 100 may be used in a variety of configurations, some of which may not include the outer surface 108 as the top surface.

As described above, the first layer 104 may be constructed from a textile material. For example, the first layer 104 may be constructed from polyester, although other similar textiles may be used.

For example, some forms of the first layer 104 may be constructed from 100% polyester. Other forms of the first layer 104 may be constructed from a polyester blend that includes polyester and at least one other material.

In some forms, the textile material may be soft and/or comfortable to touch (e.g., when a pet or human is in direct contact with the outer surface 108). The first layer 104 may also may lightweight and/or breathable. This may allow a human to use the cover 100 while sleeping (e.g., beneath other sheets and/or blankets) while not substantially overheating.

5.1.1.1 Debris Blocking

In some forms, a person may use the cover 100 in order to protect an item of furniture (or other surface) from a pet. For example, a person may wish to keep the surface of the furniture free of pet fur and other debris (e.g., dirt) that pets could otherwise bring onto the furniture.

As illustrated in FIGS. 1 and 2, pets (e.g., cats and/or dogs) may directly contact the outer surface 108 while using a particular surface. For example, the pet may lay on a bed, couch or similar surface and directly contact the outer surface 108 and not the item of furniture (or other surface).

In some forms, the outer surface 108 of the first layer 104 may act as a barrier between the debris and the furniture. For example, pets may shed fur directly onto the outer surface 108. The fur and other solid debris may be incapable of passing through the outer surface 108 and reaching the surface of the furniture beneath.

In some forms, the textile material of the first layer 104 (e.g., 100% polyester, polyester blend, etc.) may include a natural static charge. The static charge may attract fur and other debris to the outer surface 108. For example, fur shed by a pet may be oppositely charged from the outer surface 108 and may be attracted to the outer surface 108. The attraction between the outer surface 108 and the debris allows the debris to adhere to the outer surface 108. This may allow the debris to collect on the surface of the cover 100 instead of around a room (e.g., the cover 100 may also limit debris from accumulating on surfaces not in contact with the pet).

The natural static charge of the outer surface 108 may trap or retain the fur until the cover 100 is cleaned, where it may then release the fur. For example, the cover 100 may be washable (e.g., in a household washing machine). The cleaning cycle of the washing machine may release any trapped fur on the outer surface 108 (or anywhere else on the cover 100) so that the cover 100 may be reused without the accumulation of pet fur.

In some forms, a coating or finish may be applied to the outer surface 108 in order to assist with releasing the trapped fur. The coating or finish may interact with liquid (e.g., water, cleaning solution, etc.) in order to assist with the release of trapped fur.

The coating or finish may not interfere with the natural charge of the outer surface 108. For example, applying a coating or finish to the outer surface 108 may not decrease the natural charge of the polyester material so that the outer surface 108 may still trap debris. Prior to activation, the coating or finish may not substantially interfere with the adhesion between the outer surface 108 and the debris.

In some forms, the introduction of a liquid causes the coating or finish to activate. The activation of the coating or finish creates a repelling interaction between the trapped debris and the outer surface 108. This repelling interaction is sufficient to overcome the static attraction between the debris and the outer surface 108.

The cover 100 may be removed from the washing machine and returned to the surface, where the natural charge can once again attract fur and other debris until the subsequent cleaning cycle. Additionally, drying the cover 100 deactivates the coating or finish, thus allowing the natural charge of the outer surface 108 to resume attracting debris on a subsequent use. The coating or finish may be reactivated by reapplying a liquid (e.g., water and soap in a laundry machine). This may allow the cover 100 to be repeatedly used to collect and release debris.

In some forms, the coating or finish applied to the outer surface 108 may help to extend the time between washing cycles. The coating or finish may not substantially decease the comfort associated with the textile material of the outer surface 108.

In certain forms, the coating or finish may include a carbon zero (C0) finish.

In some forms, the coating or finish may provide one or more properties to the cover 100 (e.g., the first layer 104). For example, the coating or finish may create an antimicrobial, stain resistant, and/or odor resistant surface (e.g., on the outer surface 108).

In certain forms, the one or more properties may assist in providing a more cleanly surface (e.g., outer surface 108) in between washes. For example, the antimicrobial properties may reduce or eliminate bacteria in debris that pets (or humans) bring onto the cover 100. This may provide a more sanitary surface for users so that the cover 100 does not need to be washed with each use. Similarly, the odor resistant properties may reduce or eliminate a smell associated with the accumulation of pet fur or other debris (e.g., a user may perceive that the cover 100 smells clean for a longer period of time between washing cycles despite the static accumulation of fur). Finally, the stain resistant property may assist in removing stains on the outer surface 108 caused by debris prior to the cover 100 being washed (e.g., dirt tracked onto the outer surface 108 may not immediately stain the cover 100 so that a user has time to wash the cover 100). The stain resistant property may work together with the debris releasing property of the coating or finish on the outer surface 108. For example, liquid activation of the coating or finish may cause an interaction with any stains on the outer surface 108. A chemical interaction between the liquid, the coating or finish, and the stain may reduce or eliminate the stain from the outer surface 108.

In some forms, the coating or finish may also provide a wicking finish that will assist in removing the accumulated debris from the surface of the cover 100. For example, the wicking finish may create a hydrophilic layer that attracts liquid during the cleaning process (e.g., in the washing machine). The attraction of water with the outer surface 108 activate the soil release property of the outer surface 108, which may assist in releasing the statically attracted pet hair in order to clean and reuse the cover 100. For example, in certain forms, the wicking finish may assist in ensuring that the soil release property is activated in the entirety of the outer surface 108. This may be particularly useful if the cover 100 is hand washed.

In some forms, the coating or finish may have a soil release property. In addition to releasing large, soil debris (e.g., accumulated pet fur) during the cleaning cycle, the coating or finish may release bacteria and/or odor accumulated during use of the cover. As described above, an antimicrobial finish may assist in limiting the accumulation of bacteria on the outer surface 108 (e.g., may help to keep the cover 100 clean during use). However, the soil release property may further assist in removing the bacteria from the outer surface 108. For example, the liquid activation of the coating or finish may create a chemical response that releases bacteria and/or odor from the cover 100. This may provide a more thorough clean than can be achieved by the antimicrobial finish during use. Additionally, the odor resistant finish may limit the observance of odor caused by the debris, but the soil release property may assist in removing the cause of the odor. Finally, the soil release property may assist in cleaning debris that the stain resistant property blocked from staining the outer surface 108.

5.1.1.2 Liquid Blocking

In some forms, a person may use the cover 100 in order to protect an item of furniture (or other surface) from liquids that could otherwise damage the surface.

For example, a person may wish to keep the surface of the furniture free of pet secretions that pets could otherwise discharge onto the furniture. The secretions may include, but are not limited to, urine, vomit, and/or blood. In addition to staining a surface, the liquids could soak into the surface, which may require cleaning or replacement. Additionally, a person may wish to keep the surface free from other liquids (e.g., from drinks spilling onto a surface). A person may also use the cover 300 to keep car seats dry after being at the beach or pool, or otherwise keep hair off of their car seats (see e.g., FIG. 11).

As described above with respect to FIGS. 1 and 2, a pet (and/or person) may directly contact the outer surface 108 while using a particular surface. Any liquid secretions may therefore be discharged directly onto the outer surface 108. The outer surface 108 may act as an initial barrier to block the secretions from reaching the surface beneath the cover 100.

In some forms, the first layer 104 may be an absorptive layer (e.g., have absorptive properties). When liquid contacts the outer surface 108, the absorptive properties allow the first layer 104 to soak up the liquid.

In some forms, the first layer 104 may disperse the liquid throughout the entire layer. In other words, the liquid may not be concentrated at a single location, and instead may spread to a wider area than the where the secretion occurred.

In certain forms, this may limit beading and/or pooling of the liquid. For example, if the liquid remains concentrated in a small area, it may not all be absorbed and droplets or pools of liquid may remain (e.g., either of which could run off onto the floor or another uncovered surface). The absorption properties of the first layer 104 minimizes or reduces the beading or pooling from occurring so that the liquid remains trapped in the first layer 104 and not spread around the room.

In some forms, the first layer 104 (e.g., the outer surface 108) may be coated or finished in order to promote the liquid absorption. For example, the first layer 104 may include a wicking finish (e.g., the outer surface 108 may be hydrophilic). The wicking finish may assist in wicking and absorbing secretions, and also trapping the secretions within the first layer 104 (e.g., to limit beading or pooling).

In certain forms, the wicking coating or finish may be used in conjunction with the soil resistant coating described above (e.g., antimicrobial, stain resistant, and/or odor resistant properties). For example, like solid debris, the liquid secretions may contain bacteria. An antimicrobial coating or finish may interact with the bacteria in order to assist in limiting the bacteria's spread. Additionally, the stain resistant and/or odor resistant properties may assist in preserving the cover 100 between when the secretion contacts the first layer 104 and when the cover 100 is washed. Additionally, the wicking coating may assist in disbursing liquid throughout the outer surface 108 in order to activate the soil release properties of the coating (e.g., in order to overcome static attraction between the outer surface 108 and the debris) across the entire outer surface 108.

In some forms, the coating or finish may have a similar soil release property with respect to liquids as described above with respect to solid debris. For example, a person may clean the cover 100 (e.g., in a household washing machine) after liquid contacts the cover 100. The coating or finish may assist in releasing the trapped (e.g., absorbed) liquid in order to clean the cover 100. In this way, the cover 100 may be reused after washing.

5.1.2 Second Layer

Figure 4:
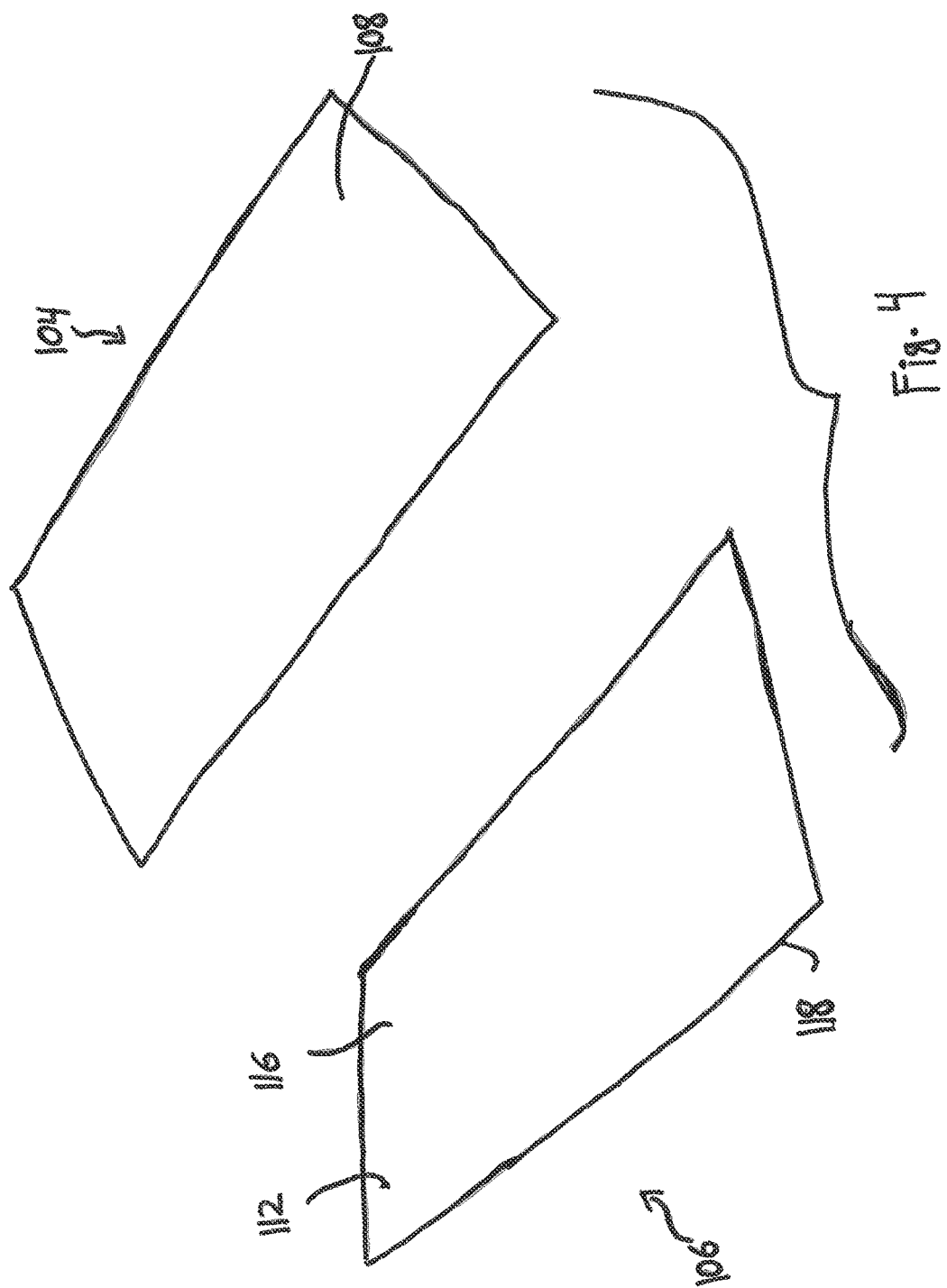
FIG. 4 is an exploded view of the cover of FIG. 1 illustrating a first layer and a second layer.
Figure 5:
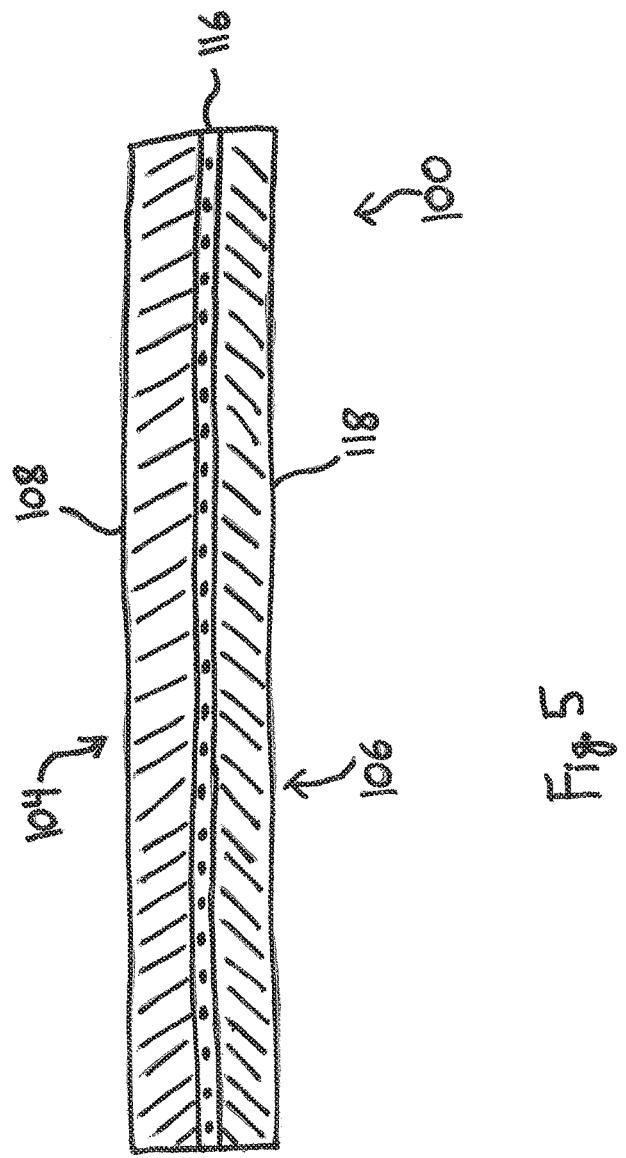
FIG. 5 is a cross-sectional view of the cover of FIG. 1 illustrating the first layer and the second layer.

As shown in FIGS. 4 and 5, the cover 100 may include a second layer 106 with a first or upper surface 112 and a second or lower surface 118 opposite to the upper surface 112. The upper surface 112 of the second layer 106 may be considered a top surface because it generally faces up during use. For example, the upper surface 112 and the outer surface 108 may face the same direction. Similarly, the lower surface 118 (alternatively referred to as a bottom surface 118) may face away from the outer surface 108, and may also be considered an outer surface. However, as described below, the cover 100 may be used in a variety of configurations, some of which may include the upper surface 112 in a different configuration.

As described above, the second layer 106 may be constructed from a textile material. For example, the second layer 106 may also be constructed from polyester, although other similar textiles may be used.

For example, the second layer 106 may be the same material as the first layer 104. Alternatively, the second layer 106 may be constructed from a different material than the first layer 104 (e.g., a different blend of polyester or a different material entirely).

In some forms, the textile material used in the second layer 106 may be soft and/or comfortable to touch (e.g., when a person is sleeping beneath the cover 100 and a pet is on the outer surface 108). The second layer 106 may also may lightweight and/or breathable. Combined with the first layer 104, the cover 100 may allow some airflow and/or limit overheating of a person underneath the cover 100. This may allow a human to comfortably use the cover 100 while sleeping (e.g., beneath other sheets and/or blankets).

In some forms, a coating may be applied to the lower surface 118 of the second layer 106. The coating may have anti-static properties in order to limit static attraction between the cover 100 and a surface (e.g., a bed). When the coating is applied, the cover 100 may be used in a single orientation (e.g., the lower surface 118 would not be a top surface because the coating limits attraction to debris). The coating may not substantially affect the breathability of the cover 100.

5.1.2.1 Liquid Blocking

In some forms, the second layer 106 may assist the first layer 104 in limiting liquid flow through the cover 100 and onto the surface below. For example, while the first layer 104 includes an absorptive property described above (e.g., in order to limit or prevent beading or pooling or liquids), liquid may be able to seep through the first layer 104. The second layer 106, therefore, may act as a barrier to block any liquids not absorbed by the first layer 104 from reaching the surface beneath the cover 100. In this way, the layers 104, 106 of the cover may work together in order to contain the liquid until the cover 100 is washed (e.g., where the liquid may be released and the cover 100 may be reused).

In some forms, the second layer 106 may be at least partially constructed from a waterproof or water resistant material. The waterproof or water resistant material may prevent or limit further penetration of the liquid through the cover 100.

In some forms, the upper surface 112 may include a laminate 116, which may substantially or completely cover the upper surface 112. The upper surface 112 with the laminate 116 may be positioned proximate to the first layer 104. For example, the laminate 116 may be adjacent to (e.g., in contact with) the first layer 104.

In some forms, the laminate 116 may be a hydrophobic material. The hydrophobic behavior of the laminate 116 may further assist in creating a barrier to liquids. For example, liquids that are not absorbed and pass through the first layer 104 may be repelled by the hydrophobic nature of the laminate 116. As a result of the dispersive properties of the first layer 104, the liquid may be spread out over the first layer 104 and the repelled from the laminate 116 so that any liquid that initially leaks through may be reabsorbed into the first layer 104. In certain forms, the laminate 116 may be a high moisture vapor transfer film. The high moisture vapor transfer of the laminate may enable greater breathability of the laminate 116, and therefore the cover 100 as a whole.

5.1.3 Manufacturing

In some forms, two sheets of material may be provided with substantially the same size. As described above, these sheets may be constructed from the same material (e.g., both from 100% polyester, both from the same polyester blend, etc.), or the sheets may be constructed from different materials.

In certain forms, the two sheets may have substantially the same thickness prior to manufacturing, although other forms may include sheets having different thicknesses.

Figure 8:
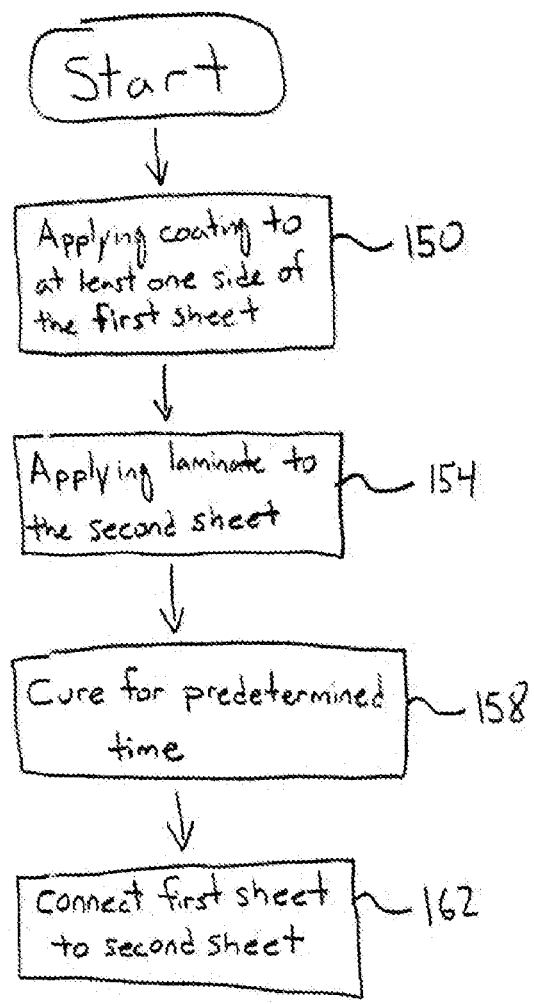
FIG. 8 is a schematic view illustrating a method of assembling the cover of FIG. 1.

As illustrated in FIG. 8, a coating or finish may be applied to at least one side of the first sheet 150. The coating or finish may be the soil release feature described above, and may impart at least one property (e.g., antimicrobial, stain resistance, odor resistance) to the first sheet. Applying the coating or finish to the first sheet 150 may therefore form the eventual first layer 104 (see e.g., FIG. 1).

In some forms, the coating or finish may only be applied to one surface of the first sheet (e.g., the eventual outer surface 108). As will be described below, the outer surface 108 is the only surface exposed to direct contact with a person or pet, while the opposite surface is an internal surface. However, the coating or finish may be applied to both sides (e.g., to counter liquid that may pass through the first layer 104) and/or the coating or finish may be applied to one side and permeable through to both sides.

In some forms, the coating or finish (e.g., having the antimicrobial, stain resistance, odor resistance) may also be applied to the second sheet (i.e., the eventual second layer 106). However, this step may also be omitted in the manufacturing process.

In some forms, applying the coating or finish to the first sheet 150 may not substantially increase the thickness of the first sheet 150. In other words, a user may not perceive any added thickness as a result of applying the coating or finish.

In some forms, a laminate 116 is applied to the second sheet 154. As described above, the laminate 116 may have hydrophobic properties, which may make it waterproof or water resistant. The laminate 116 may be applied to only one side of the second sheet (e.g., to the eventual upper surface 112), although there may be circumstances where the laminate is applied to both surfaces.

In some forms, the laminate 116 may not substantially in increase the thickness of the second sheet 154. For example, the laminate 116 illustrated in FIG. 5 is shown with a thickness for illustrative purposes, but the actual laminate 116 may have substantially no thickness relative to the second sheet 154.

In certain forms, the laminate 116 is required to cure on the second sheet for a predetermined period of time 158. In some forms, the curing process 158 may take between about 1 minute and about 1 month. In some forms, the curing 158 process may take between about 1 hour and about 1 week. In some forms, the curing process 158 may take between about 10 hours and about 50 hours. In some forms, the curing process 158 may take about 36 hours.

Once the curing process 158 (e.g., the elapsed time has passed and the laminate has set) the first sheet may be attached to the second sheet via a connecting process 162. The sheets may be oriented so that the laminate 116 on the second sheet is facing (e.g., in contact with) the first sheet. Additionally, the first sheet may be oriented so that the eventual outer surface 108 faces the same direction as the laminate 116 (e.g., is not in contact with the laminate). The first and second sheets may then be connected together to form a singular cover.

In certain forms, the connection may occur by sewing the first and second sheets together. In other forms, the first and second sheets may be bonded together (e.g., the first sheet is placed on the laminate during the curing process 158). In other forms, the first and second sheets may be removably connected together (e.g., using a mechanical fastener, hook and loop material, magnets, etc.).

In one form, the first sheet may be larger than the second sheet. Thus to connect the first and second sheets, the first sheet may wrap partially around the second sheet. After connecting the sheets and forming the cover 100, the first layer 104 may extend onto a rear side of the cover 100. For example the outer surface 108 may be partially adjacent to the lower surface 118.

As illustrated in FIG. 5, the laminate 116 may be disposed between the first and second sheets (e.g., not directly exposed to the ambient). Thus, no matter which side of the laminate is facing up, a person or pet may not be in contact with the laminate.

In some forms, a gripper surface 124 (see e.g., FIG. 7) may be applied to the second sheet 154 during the assembly process. As described below, the gripper surface 124 may be applied to the second sheet 154 in order to be facing an outer surface of the cover 100 (e.g., oriented opposite of the laminate 116). The gripper surface 124 may be applied before or after the first and second sheets 150, 154 are connected.

5.1.4 Use

In use, a person may drape or place the cover 100 on a desired surface in order to assist in protecting the surface from pets.

In use, a person may drape or place the cover 100 on a desired surface in order to assist in protecting the surface from liquid and/or debris. As described, the cover could be used in an automobile to protect seats from sand and/or water regardless of whether a pet was in the car.

For example, as illustrated in FIGS. 1 and 2, the cover 100 may be used with different types of furniture. However, the cover 100 is not limited to uses with the illustrated pieces of furniture (i.e., a bed or a couch), and may also be used with other pieces of furniture (e.g., a chair). Additionally, the cover 100 may be placed directly onto the floor (e.g., and used as a rug) or used to protect the interior seating or loading surfaces of an automobile (truck, car, etc.).

When placed onto the desired surface, the cover 100 may be oriented so that the first layer 104 (and therefore the outer surface 108) is facing up. However, as described above, the coating or finish may be applied to the second layer 106 so that the second layer 106 is also antimicrobial, stain resistant, odor resistant. This may allow the cover 100 to be used in either orientation (i.e., outer surface 108 up or down), and may avoid accidental orientations (e.g., a user placing the cover in an ineffective position).

In certain forms, the first and second layers 104, 106 may be patterned. Each layer 104, 106 may include the same pattern, or each may include a separate pattern. If separate patterns are used, the cover 100 may be reversible. In other words, the user could determine whether the first layer 104 or the second layer 106 is visible based on aesthetic preferences. Either outer surface may feel similar so that a person or pet contacting either may experience a similar level of comfort.

In one form, the pattern on the first layer and/or the second layer may serve a purely aesthetic purpose, which may assist in encouraging the person to continue to use the cover 100.

Once the cover 100 is properly positioned, a person or pet may sit or lay on top of the cover 100. Because the first and second layers 104, 106 are connected together, there may be little to no relative movement between the first and second layers 104, 106. In other words, the laminate 116 may not move to a position where it is entirely under the first layer 104 (i.e., assuming the outer surface 108 is facing up).

In some forms, the cover 100 may be flexible so that it can conform to different shaped surfaces. For example, as illustrated in FIGS. 1 and 2, the bed and the couch may be differently shaped, and the cover 100 may be able to flex in different ways in order to cover the respective surface. The textile materials of the first and second layers 104, 106 may be able to bend in order to conform to the different shapes. Additionally, the laminate 116 may not substantially rigidize the cover 100. In other words, the cover 100 may still be substantially flexible with the laminate 116. The reduced thickness of the laminate 116 may contribute to the flexibility of the cover 100. For example, the laminate 116 may be thinner than the textile materials of the first and second layers 104, 106.

In some forms, the reduced thickness of the laminate 116 may also not substantially limit user comfort. For example, the laminate 116 may not substantially limit the cover 100 from bending or flexing in response to the weight of a pet or human. This may allow the pet or human to sit or lie comfortably on the surface without substantial interference from the cover 100.

In some forms, the cover 100 may include a retention feature in order to assist the cover in maintaining a proper orientation on the surface (e.g., to limit slipping as a result of a pet resting on the cover 100).

Figure 6:
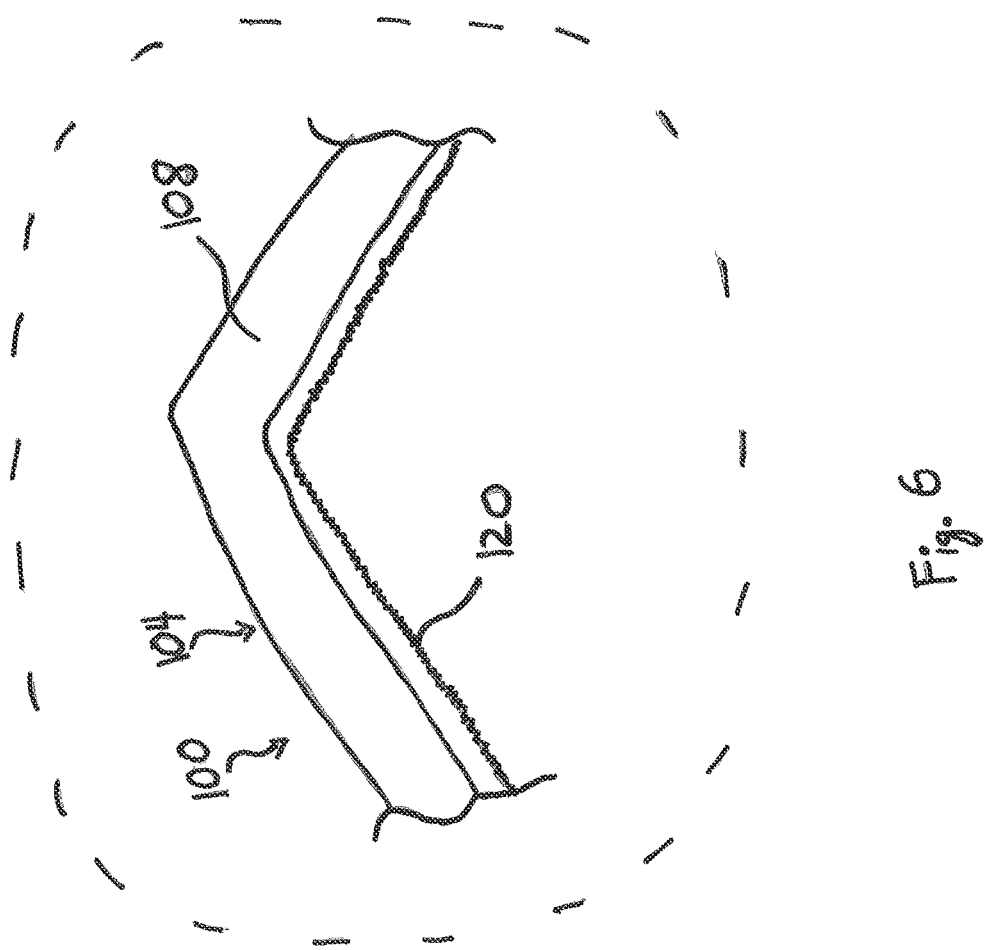
FIG. 6 is a detail view of one example of a cover illustrating a grip feature for retaining the position of the cover.

As shown in FIG. 6, at least one corner of the cover 100 may include a retention feature 120. The retention feature 120 may be formed similar to a fitted sheet and may include an elastic portion. The retention feature 120 may be capable of fitting over a corner of a surface (e.g., a corner of the bed), in order to at least partially maintain the position of the cover 100.

For example, the cover 100 may include two retention features 120 in the form of an elastic portion. The retention features 120 may be formed at adjacent corners. In use, the user may position the retention features around the bottom corners of a bed (see e.g., FIG. 1) so that the cover is coupled to the bed. An opposite end of the cover 100 (e.g., proximate to where a use's is would be located) does not include the retention features 120 and may be movable relative to the bed so that the user can get under the cover 100.

Figure 7:
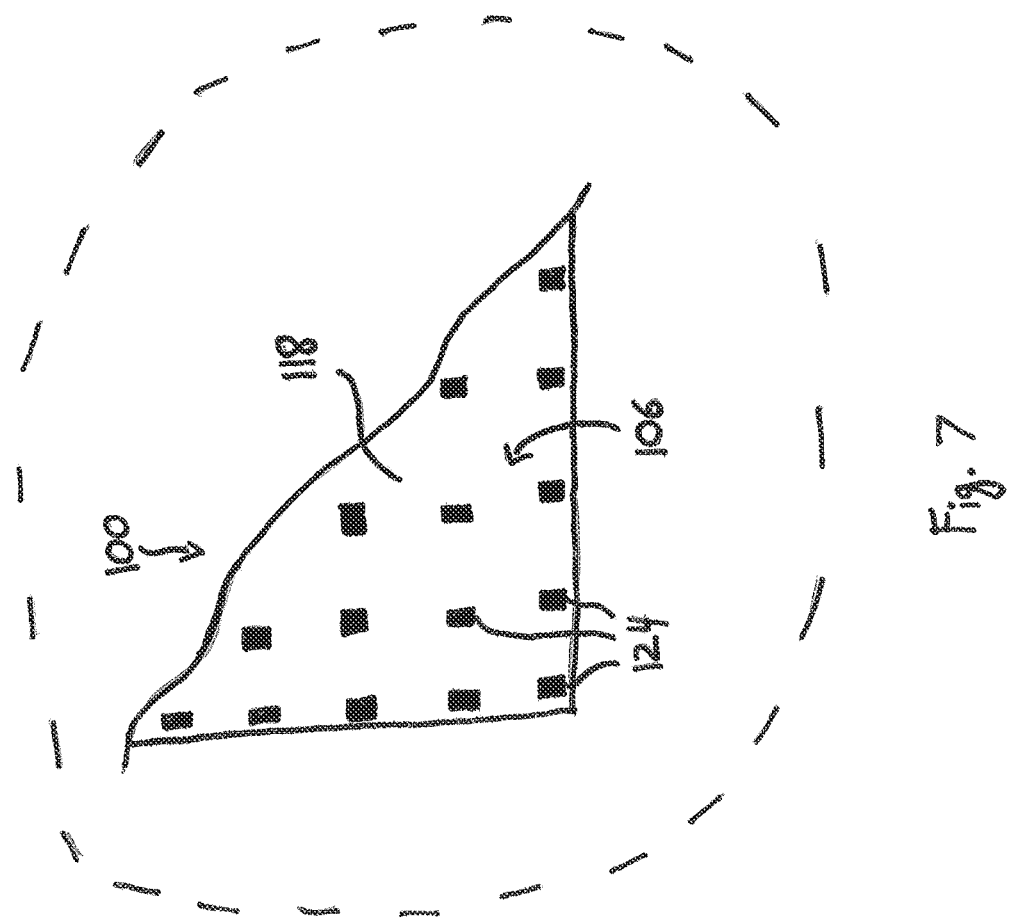
FIG. 7 is a detail view of a bottom surface a cover illustrating an alternate grip feature for retaining the position of the cover.

As shown in FIG. 7, an alternate or additional retention feature may be a gripper surface 124. The gripper surface 124 may be positioned on the lower surface 118 of the second layer 106 (e.g., facing the opposite direction from the outer surface 108). The gripper surface 124 may increase the frictional engagement between the cover 100 and the surface in order to limit sliding.

The elastic retention feature 120 and the gripper surface 124 may be used together to provide improved retention. For example, the gripper surface 124 may assist in limiting the movement of the cover 100 relative to the bed at the end opposite of the elastic retention feature 120. This may limit the cover 100 from sliding at the head of the bed despite the absence of the elastic retention feature 120.

In some forms, the gripper surface 124 may cover an entire outer surface of the cover 100 (e.g., may cover the entire second layer 106). In other forms, the gripper surface 124 may only cover select portions of the cover 100.

Figure 11:
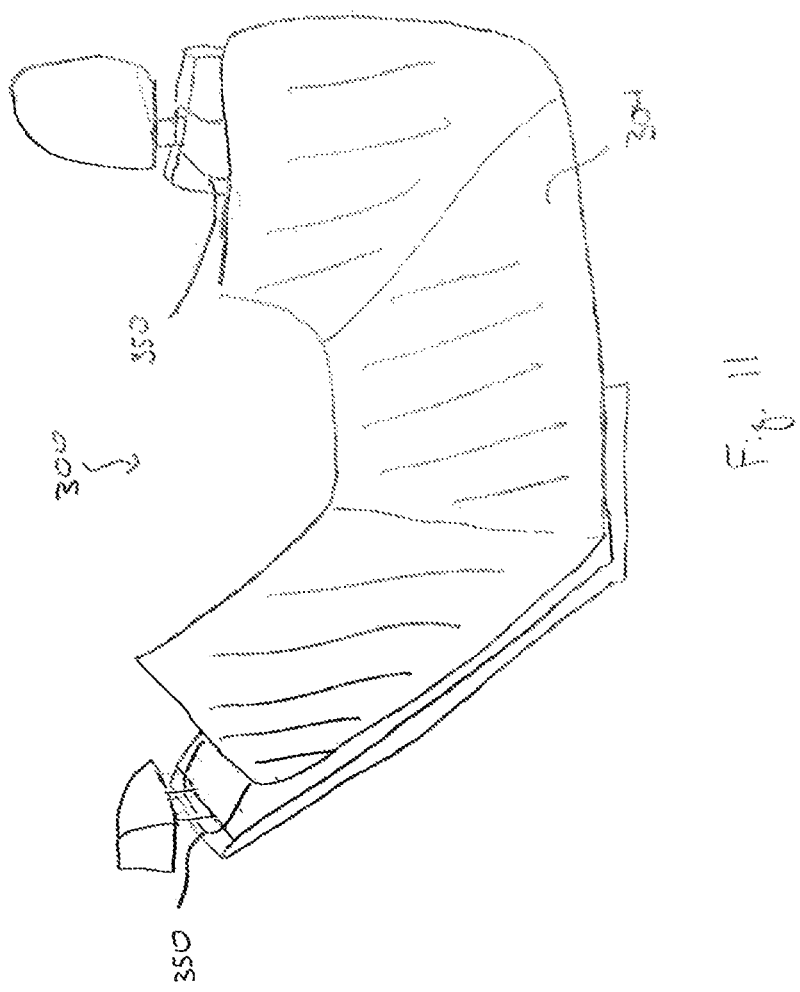
FIG. 11 is a perspective view of another form of a cover used as a car sling.

In some forms, a cover may include additional retention features specific to uses in other locations. For example, FIG. 11 illustrates a cover 300 used in a car may include features 350 (e.g., straps) for connecting to the headrests on seats (e.g., in order to create a sling across the back seat of an automobile). The cover 300 may also include the gripper surface 124 (see e.g., FIG. 7) in order to limit relative movement between the cover 100 and the seat. The cover 300 may be substantially similar to the other covers described herein. For example, the outer layer 304 may be face up so that a pet contacts the surface. The outer layer 304 may have the same properties as the outer layer 104. Additionally, the cover 300 may have a laminate substantially similar to the laminate 116.

Figure 10:
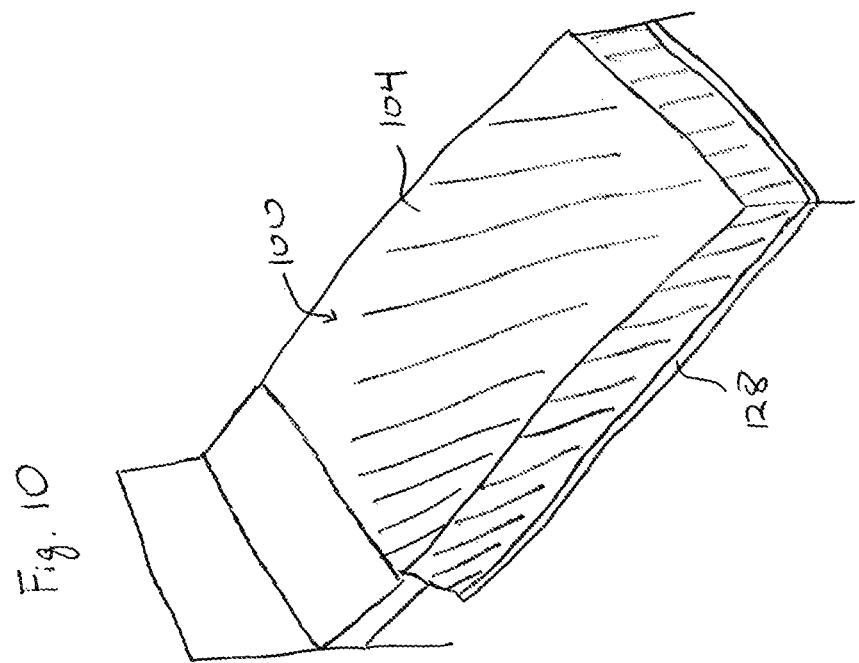
FIG. 10 is a perspective view of a cover in use on a bed in accordance with another form of the present technology where the cover includes batting around at least a portion of the edges.

In some forms (see e.g., FIG. 10), the cover 100 may include batting 128 in order to help weigh down the cover 100 and create stability on the surface (e.g., limit shifting or other movement). The batting 128 may be used separately from or in addition to the elastic retention feature 120 and/or the gripper surface 124.

In some forms, the batting 128 may be disposed around at least a portion of the cover 100. For example, the batting 128 may be disposed around an outer perimeter of the cover 100. In the illustrated example, the batting 128 may extend around the entire perimeter.

In some forms, the batting 128 may be positioned between the first and second layers 104, 106. In this way, the batting is not exposed during use (e.g., to increase decorative appear, to protect the batting, etc.). In other forms, the batting 128 may be coupled to the outer surface 108 and/or to the lower surface 118.

The batting 128 may be constructed from a comfortable material in order to reduce discomfort caused by the batting 128. For example, the batting 128 may be constructed from a textile material, a foam material, and/or other non-rigid materials. One example may be cotton filler.

In the illustrated example, the batting 128 may be disposed along an outer perimeter of the cover 100. A batting 128 may be held in place between the outer perimeter and stitching, which may limit the movement of the batting 128 relative to the first layer 104 and/or the second layer 106.

Figure 9:
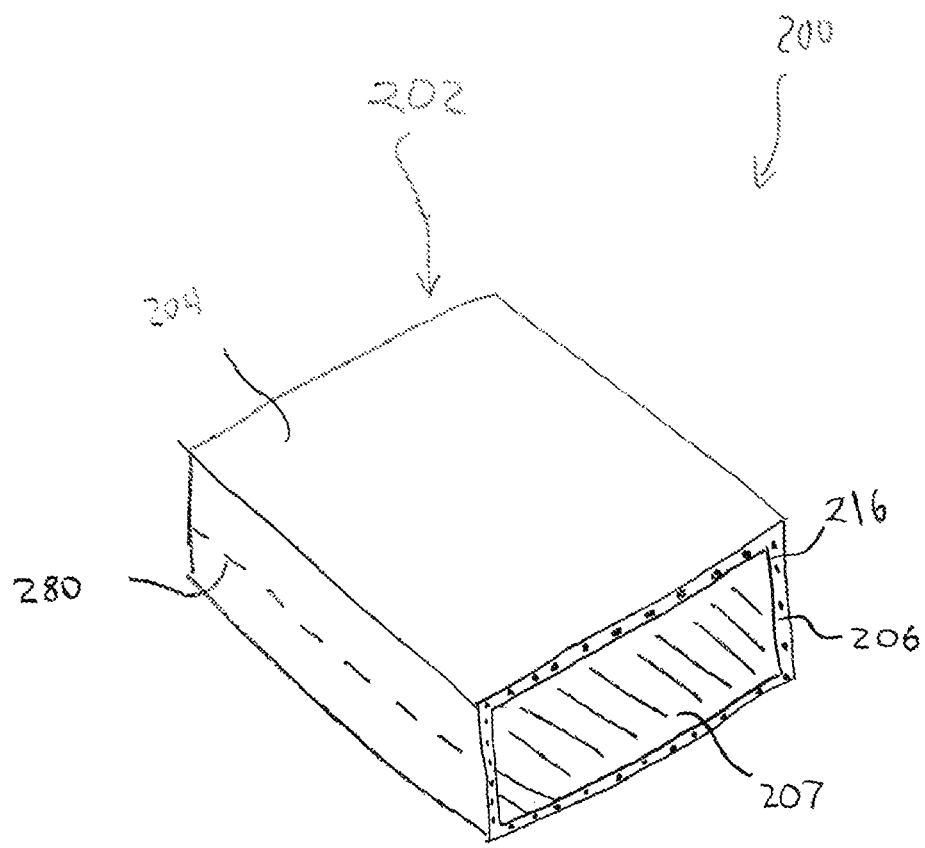
FIG. 9 is a partial cross-sectional view of another form of a cover used with a pet bed.

As shown in FIG. 9, the same (or substantially the same) material used to form the cover 100 may be used in other applications. For example, the material may be used to form the outer cover 202 of a dog bed 200. As with the cover 100, the outer cover 202 may include a first layer 204 and a second layer 206. The first and second layers 204, 206 may be substantially the same as the first and second layers 104, 106, and only some similarities and differences may be described below. Cover 202 may include a coating or finish that provides the cover 202 with substantially the same properties as the cover 100.

In some forms, the second layer 206 may include a hydrophobic laminate 216 that blocks the penetration of liquid in order to prevent damage to the cushioning material 207. The hydrophobic laminate 216 may be similar to the laminate 116.

The outer cover may be constructed from a textile material (e.g., polyester) like the cover 100. Accordingly, the cover 202 may exhibit similar debris collecting properties as a result of a natural charge.

In some forms, the cover 202 may be removably connected to a cushioning material 207. A user may remove the cover 202 in order to wash or otherwise clean the cover 202 as described above with respect to the cover 100.

In some forms, the cover 202 may include a zipper 280 in order to removable secure the cover 202 to the cushioning material 207.

5.2 Other Remarks

A portion of the disclosure of this patent document contains material which is subject to copyright protection. The copyright owner has no objection to the facsimile reproduction by anyone of the patent document or the patent disclosure, as it appears in Patent Office patent files or records, but otherwise reserves all copyright rights whatsoever.

Unless the context clearly dictates otherwise and where a range of values is provided, it is understood that each intervening value, to the tenth of the unit of the lower limit, between the upper and lower limit of that range, and any other stated or intervening value in that stated range is encompassed within the technology. The upper and lower limits of these intervening ranges, which may be independently included in the intervening ranges, are also encompassed within the technology, subject to any specifically excluded limit in the stated range. Where the stated range includes one or both of the limits, ranges excluding either or both of those included limits are also included in the technology.

Furthermore, where a value or values are stated herein as being implemented as part of the technology, it is understood that such values may be approximated, unless otherwise stated, and such values may be utilized to any suitable significant digit to the extent that a practical technical implementation may permit or require it.

Unless defined otherwise, all technical and scientific terms used herein have the same meaning as commonly understood by one of ordinary skill in the art to which this technology belongs. Although any methods and materials similar or equivalent to those described herein can also be used in the practice or testing of the present technology, a limited number of the exemplary methods and materials are described herein.

When a particular material is identified as being used to construct a component, obvious alternative materials with similar properties may be used as a substitute. Furthermore, unless specified to the contrary, any and all components herein described are understood to be capable of being manufactured and, as such, may be manufactured together or separately.

It must be noted that as used herein and in the appended claims, the singular forms "a", "an", and "the" include their plural equivalents, unless the context clearly dictates otherwise.

All publications mentioned herein are incorporated herein by reference in their entirety to disclose and describe the methods and/or materials which are the subject of those publications. The publications discussed herein are provided solely for their disclosure prior to the filing date of the present application. Nothing herein is to be construed as an admission that the present technology is not entitled to antedate such publication by virtue of prior invention. Further, the dates of publication provided may be different from the actual publication dates, which may need to be independently confirmed.

The terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

The subject headings used in the detailed description are included only for the ease of reference of the reader and should not be used to limit the subject matter found throughout the disclosure or the claims. The subject headings should not be used in construing the scope of the claims or the claim limitations.

Although the technology herein has been described with reference to particular examples, it is to be understood that these examples are merely illustrative of the principles and applications of the technology. In some instances, the terminology and symbols may imply specific details that are not required to practice the technology. For example, although the terms "first" and "second" may be used, unless otherwise specified, they are not intended to indicate any order but may be utilized to distinguish between distinct elements. Furthermore, although process steps in the methodologies may be described or illustrated in an order, such an ordering is not required. Those skilled in the art will recognize that such ordering may be modified and/or aspects thereof may be conducted concurrently or even synchronously.

It is therefore to be understood that numerous modifications may be made to the illustrative examples and that other arrangements may be devised without departing from the spirit and scope of the technology.

| REFERENCE SIGNS LIST | |
|---|---|
| cover | 100 |
| first layer | 104 |
| second layer | 106 |
| outer surface | 108 |
| upper surface | 112 |
| laminate | 116 |
| lower surface | 118 |
| elastic retention feature | 120 |
| gripper surface | 124 |
| batting | 128 |
| applying to first sheet | 150 |
| applying to second sheet | 154 |
| curing | 158 |
| connecting process | 162 |
| pet bed | 200 |
| outer cover | 202 |
| first layer | 204 |
| second layer | 206 |
| cushioning material | 207 |
| laminate | 216 |
| zipper | 280 |

The invention claimed is:

1. A multilayer cover configured to protect a surface from solid debris and liquid secretions, the multilayer cover being washable and comprising:
a first layer constructed from a first textile including a polyester material, the first layer comprising:
a first exterior surface having a natural static charge and a first hydrophilic finish, the natural static charge configured to attract solid debris and the first hydrophilic finish configured to promote wicking of liquid into the first textile and trapping liquid within the polyester material of the first layer, the first hydrophilic finish being configured to provide the first layer with a dispersive property to assist in disbursing liquid throughout the first layer, and
a first interior surface opposite to the first top surface;
a second layer constructed of a second textile material including a polyester material, the second textile material being the same as the first textile material, the second layer being coupled to the first layer, the second layer being fixed relative to the first layer, the second layer comprising:
a second interior surface disposed facing the first interior surface, the second interior surface including a hydrophobic laminate, the hydrophobic laminate comprising an air permeable film configured to block liquid from passing therethrough, the film having a thickness that is less than a thickness of each of the first layer and the second layer, and
a second exterior surface opposite of the second interior surface, the second exterior surface having a second hydrophilic finish, wherein the second hydrophilic finish is the same as the first hydrophilic finish and configured to promote wicking of liquid into the second textile and trapping liquid within the polyester material of the second layer, the second hydrophilic finish being configured to provide the second layer with a dispersive property to assist in disbursing liquid throughout the second layer,
wherein the cover is configured to be oriented in a first orientation exhibiting a first wicking function with the first exterior surface facing the surface and in a second orientation exhibiting a second wicking function which is the same as the first wicking function with the second exterior surface facing the surface in use,
wherein the hydrophobic laminate is configured to block liquid from passing from the first layer to the second layer in the first orientation and block liquid from passing from the second layer to the first layer in the second orientation,
wherein, when the second layer is placed to face the surface, the first hydrophilic finish and the first layer are configured to allow liquid to pass through the first layer, and the hydrophobic laminate is configured to repel the liquid for re-absorption by the first layer due to the dispersive property of the first layer whereby liquid is trapped within the first layer,
wherein, when the first layer is placed to face the surface, the second hydrophilic finish and the second layer are configured to allow liquid to pass through the second layer, and the hydrophobic laminate is configured to repel the liquid for re-absorption by the second layer due to the dispersive property of the second layer whereby liquid is trapped within the second layer, and
wherein the first layer, the second layer and the hydrophobic laminate are configured to work together in order to contain liquid until the cover is washed, at which point the contained liquid is released.

2. The multilayer cover of claim 1, wherein each of the first layer and the second layer is 100% polyester.

3. The multilayer cover of claim 1, wherein each of the first layer and the second layer is a polyester blend.

4. The multilayer cover of claim 1, wherein the first layer and the second layer are sewn together.

5. The multilayer cover of claim 1, wherein the hydrophilic finish has an antimicrobial property, a stain resistant property, and/or an odor resistant property.

6. The multilayer cover of claim 1, wherein the first top surface does not include fluorinated carbon.

7. The multilayer cover of claim 1, wherein the hydrophobic laminate is at least partially permeable to air and is configured to allow airflow to pass through the first layer and the second layer.

8. The multilayer cover of claim 1, further comprising a retention feature configured to maintain the position of the first layer and the second layer relative to the surface.

9. The multilayer cover of claim 8, wherein the retention feature is an elastic portion formed in at least on corner of the first layer and the second layer, the elastic portion having a first position and a second position expanded from the first position.

10. The multilayer cover of claim 8, wherein the retention feature is at least one gripper formed on the second bottom surface, and wherein the gripper has a greater coefficient of friction than the second bottom surface.

11. The multilayer cover of claim 1, wherein each said hydrophilic finish is configured to deactivate upon drying and reactivated upon subsequent contact with the liquid.

12. The multilayer cover of claim 1, wherein each said hydrophilic finish further includes a soil release property configured to release accumulated odors and/or stains upon contact with the liquid.

13. The multilayer cover of claim 1, wherein each said hydrophilic finish is configured to absorb and disperse fluid throughout the first layer.

14. The multilayer cover of claim 1, wherein the second bottom surface includes an anti-static coating and is configured to limit static attraction with the surface.

15. The multilayer cover of claim 1, further comprising a batting extending around at least a portion of the perimeter of the cover, and wherein the batting configured to weigh down the first layer and the second layer to the surface.

16. The multilayer cover of claim 15, wherein the batting is positioned between the first layer and the second layer, and wherein the batting is retained in place via sewing.

17. The multilayer cover of claim 1, wherein each of the first hydrophilic finish and the second hydrophilic finish:
has an antimicrobial property, a stain resistant property, and an odor resistant property, and is configured to release accumulated odors and/or stains upon contact with the liquid; and
is configured to absorb and disperse fluid throughout the first layer, and
is configured to deactivate upon drying and reactivated upon subsequent contact with the liquid.

18. The multilayer cover of claim 17, wherein:
the hydrophobic laminate is at least partially permeable to air and is configured to allow airflow to pass between the first layer and the second layer.

19. A multilayer cover configured to protect a surface from solid debris and/or liquid secretions, the multilayer cover being washable and reusable and comprising:
a first layer constructed from a first textile, the first layer comprising:
a first exterior surface having a first hydrophilic finish, the first hydrophilic finish configured to promote wicking and absorbing of liquid into the first textile and trapping liquid within the first layer, the first hydrophilic finish being configured to provide the first layer with a dispersive property to assist in disbursing liquid throughout the first layer, and
a first interior surface opposite to the first top surface;
a second layer constructed of a second textile material, the second textile material being the same as the first textile material, the second layer being coupled to the first layer, the second layer being fixed relative to the first layer, the second layer comprising:
a second interior surface disposed facing the first interior surface, the second interior surface, and
a second exterior surface opposite of the second interior surface, the second exterior surface having a second hydrophilic finish which is the same as the first hydrophilic finish; and
an hydrophobic layer positioned between the first and second layers, the hydrophobic layer comprising an air permeable film configured to block liquid from passing from the first layer and through the second layer, the film having a thickness that is less than a thickness of each of the first layer and the second layer,
wherein, when the second layer is placed to face the surface, the first hydrophilic finish and the first layer are configured to allow liquid to pass through the first layer, and the hydrophobic layer is configured to repel the liquid for re-absorption by the first layer due to the dispersive property of the first layer whereby liquid is trapped within the first layer, and
wherein, when the first layer is placed to face the surface, the second hydrophilic finish and the second layer are configured to allow liquid to pass through the second layer and the hydrophobic layer is configured to repel the liquid for re-absorption by the second layer due to the dispersive property of the second layer whereby liquid is trapped within the second layer,
wherein the first layer, the second layer and the hydrophobic layer are configured to work together in order to contain liquid until the cover is washed, at which point the contained liquid is released.

* * * * *